United States Patent [19]
Kammerzell et al.

[11] Patent Number: 5,947,502
[45] Date of Patent: Sep. 7, 1999

[54] RAPIDLY ERECTABLE PORTABLE STAGE

[75] Inventors: Donald L. Kammerzell; Don T. Engler, Jr., both of Phoenix, Ariz.

[73] Assignee: K-Zell Metals, Inc., Phoenix, Ariz.

[21] Appl. No.: 08/725,624

[22] Filed: Oct. 3, 1996

[51] Int. Cl.⁶ ............................................. E04H 3/28
[52] U.S. Cl. .............................. 280/442; 52/7; 52/143; 108/143; 472/75; 472/92
[58] Field of Search ............................. 280/442, 419, 280/456.1, 460.1, 47.11; 52/143, 79.5, 79.9, 64, 7; 472/75, 77, 92; 108/185, 143; 296/21, 26

[56] References Cited

U.S. PATENT DOCUMENTS

| | | | |
|---|---|---|---|
| Re. 34,468 | 12/1993 | Rau et al. | 296/26 |
| 1,170,712 | 2/1916 | Trombley | 296/26 |
| 1,340,414 | 5/1920 | Schneider | 280/442 |
| 2,602,196 | 7/1952 | Pelton | 472/77 |
| 3,620,564 | 11/1971 | Wenger et al. | |
| 3,866,913 | 2/1975 | Zimmers | 108/64 |
| 4,026,076 | 5/1977 | Analetto | 52/6 |
| 4,232,488 | 11/1980 | Hanley | 52/7 |
| 4,917,217 | 4/1990 | Rogers et al. | 182/152 |
| 4,953,886 | 9/1990 | Grant | 280/47.11 |
| 5,017,064 | 5/1991 | Kirwan et al. | 188/32 |
| 5,078,442 | 1/1992 | Rau et al. | 296/26 |
| 5,152,109 | 10/1992 | Boers | 52/143 |
| 5,275,064 | 1/1994 | Hobbs | 108/143 |
| 5,290,058 | 3/1994 | Adam | 108/143 |
| 5,327,698 | 7/1994 | Uhl | 52/68 |
| 5,329,825 | 7/1994 | Askins | 108/143 |

FOREIGN PATENT DOCUMENTS

| | | | |
|---|---|---|---|
| 164655 | 5/1949 | Austria | 52/7 |
| 3015384 | 10/1981 | Germany | 52/7 |
| 406109879 | 4/1994 | Japan | 52/7 |

OTHER PUBLICATIONS

Haldeman Homme Mfg. Co. catalog, Erickson Stage, Apr. 1958.

*Primary Examiner*—Anne Marie Boehler
*Attorney, Agent, or Firm*—Cahill, Sutton & Thomas P.L.C.

[57] ABSTRACT

A portable stage, transportable in a stacked configuration on a conventional truck trailer, has two modular units manually or vehicularly positionable side-by-side to define the platform of the stage. The platform of one unit is laterally and angularly relocatable relative to the supporting frame to position it contactingly adjacent the platform of the other unit. A plurality of carts, nestable as pairs intermediate the stacked units during transport, are deployed to convey the equipment used on the stage from a source or depot to the assembled stage and return. A pair of ramps serve multiple functions of loading and unloading the units and the carts and are configured to be anchored to different load bearing receiving elements. A specifically configured detachably attached yoke permits turning of pivotally mounted paired wheel trucks while positioning a unit to assemble or disassemble the stage. The units may include detachably attached platform extensions to increase the length and foldable platform sides to increase the width. A manually vertically locatable landing is disposed at one end of a unit. Raceways beneath at least one platform and access holes in the platform provide for routing of power cables and other electrical conduits to equipment to be used on the stage. Wheel chocks, interacting with opposed pairs of wheels of the wheel trucks, positionally stabilize each of the wheel trucks during transport. Rotatably mounted extendable jacks assist in supporting each of the units of the assembled stage.

19 Claims, 8 Drawing Sheets

RAPIDLY ERECTABLE PORTABLE STAGE

BACKGROUND OF THE INVENTION

1. Field of the Invention

The present invention relates to portable stages and, more particularly, to rapidly erectable units assemblable to form a stage and rapidly disassemblable onto a conventional flatbed trailer for transport.

2. Description of Related Art

During the half-time at sporting events, such as football, entertainment is usually provided on the field of play. Such entertainment may take the form of marching bands, and similar groups who perform upon the field or playing surface. When gymnasts and the like perform, mats or other stable surfaces are laid upon the playing surface to provide a sure footing for the performers. If musical groups, with or without singers and/or dancers, provide the entertainment, a stage is often used. Such a stage must be rapidly brought onto the playing surface and erected to the extent necessary for use. Thereafter, the stage must be quickly disassembled and removed from the playing surface. Existing stages for this purpose suffer from several problems. First, they are not very rapidly assemblable and disassemblable which significantly reduces the period of entertainment provided during half-time. Second, the movement of the stage on and off the field may result in ruts in the playing surface by both the stage and the vehicles used to draw the stage on and off the field. Third, the weight of the stage, when assembled, may cause damage to the playing surface in the form of severe depressions or holes. Fourth, activities relating to the movement of the stage components on and off the field may cause damage to the playing surface significant enough to affect the game being played. Because of the weight and cumbersomeness of existing stages, the size of a stage useable for this purpose is severely limited and therefore limits the type and nature of entertainment that can be performed on the stage. Few, if any, existing stages are transportable on highways by conventional flatbed trailers pulled by tractor trucks and require special permits or suffer from limitations attendant oversize loads. Finally, the cumbersomeness of existing stages places severe fiscal and practical constraints on transporting the stages from one location to another.

SUMMARY OF THE INVENTION

Each unit of a pair of units includes a rectangular platform mounted upon an open frame. Each of the frames is supported upon steerable wheel trucks to accommodate positioning the units to locate the platforms adjacent one another to form a stage. One of the platforms is horizontally slidable with respect to its frame to permit final close tolerance alignment with the adjacent platform. A manually or vehicularly movable yoke is detachably attachable to pairs of wheel trucks at either or each end of a frame to permit steering the unit during assembly and disassembly of the stage. To accommodate transport of the units upon a conventional flatbed trailer and to provide sufficient width for each platform, a longitudinally extending foldable platform side may be incorporated. To increase the length of each platform, detachably attachable platform extensions may be provided. One of the platforms may include a vertically positionable landing which is foldable during transport upon the trailer. By use of a specially configured pair of ramps, the units are stackable upon the trailer for long distance transport. Nestable pairs of carts loadable upon the lower stacked unit for long distance transport may be used to convey to and from the stage the equipment to be used on the stage. To minimize damage to the stage supporting surface, the units are of aluminum members and plywood sheets to minimize the weight without structural compromise; furthermore, the plurality of wheels attendant each wheel truck provides a significant footprint to reduce the pressure upon the supporting surface. By use of extendible jacks having large surface area feet, the supporting pressure can be further reduced along with providing an anchoring effect to minimize movement of the units during use of the stage. To reduce the likelihood of movement of the platforms when stacked upon a trailer, special wheel chocks may be employed.

It is therefore a primary object of the present invention to provide a readily erectable and dismantlable stage for short term use.

Another object of the present invention is to provide a stage erectable from a pair of units which are rapidly positionable in place.

Yet another object of the present invention is to provide a unit of a stage having a platform and a frame constructed of aluminum members to minimize the weight without compromising rigidity.

Still another object of the present invention is to provide four steerable wheel trucks for each of a pair of units jointly forming a stage to facilitate positioning of the units adjacent one another to form the stage.

Still another object of the present invention is to provide a detachably attachable steering yoke for steering a pair of wheel trucks disposed at an end of a unit.

A further object of the present invention is to provide a unit having a platform slidable with respect to its underlying frame to permit positioning the platform in alignment with and adjacent to a platform of an adjacent unit.

A yet further object of the present invention is to provide ramps for serially stacking a pair of units forming a stage upon a conventional flatbed trailer.

A still further object of the present invention is to provide a plurality of nestable carts for conveying equipment to and from a stage and transportable upon a conventional flatbed trailer between stacked units forming the stage.

These and other objects of the present invention will become apparent to those skilled in the art as the description thereof proceeds.

BRIEF DESCRIPTION OF THE DRAWINGS

The present invention will be described with greater specificity and clarity with reference to the following drawings, in which.

DETAILED DESCRIPTION OF THE PREFERRED EMBODIMENT

Figure 1:
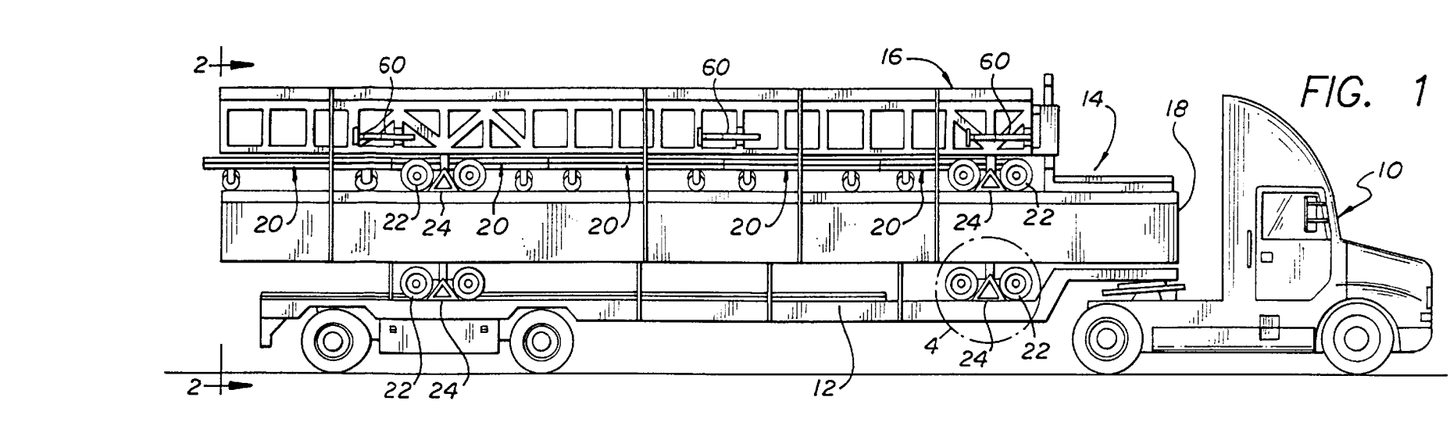
FIG. 1 is a side view illustrating a pair of units erectable into a stage and stacked upon a conventional flatbed trailer and pairs of nested carts located upon the lower unit during transport from one location to another.
Figures 2, 3D, 4, 5, 6:
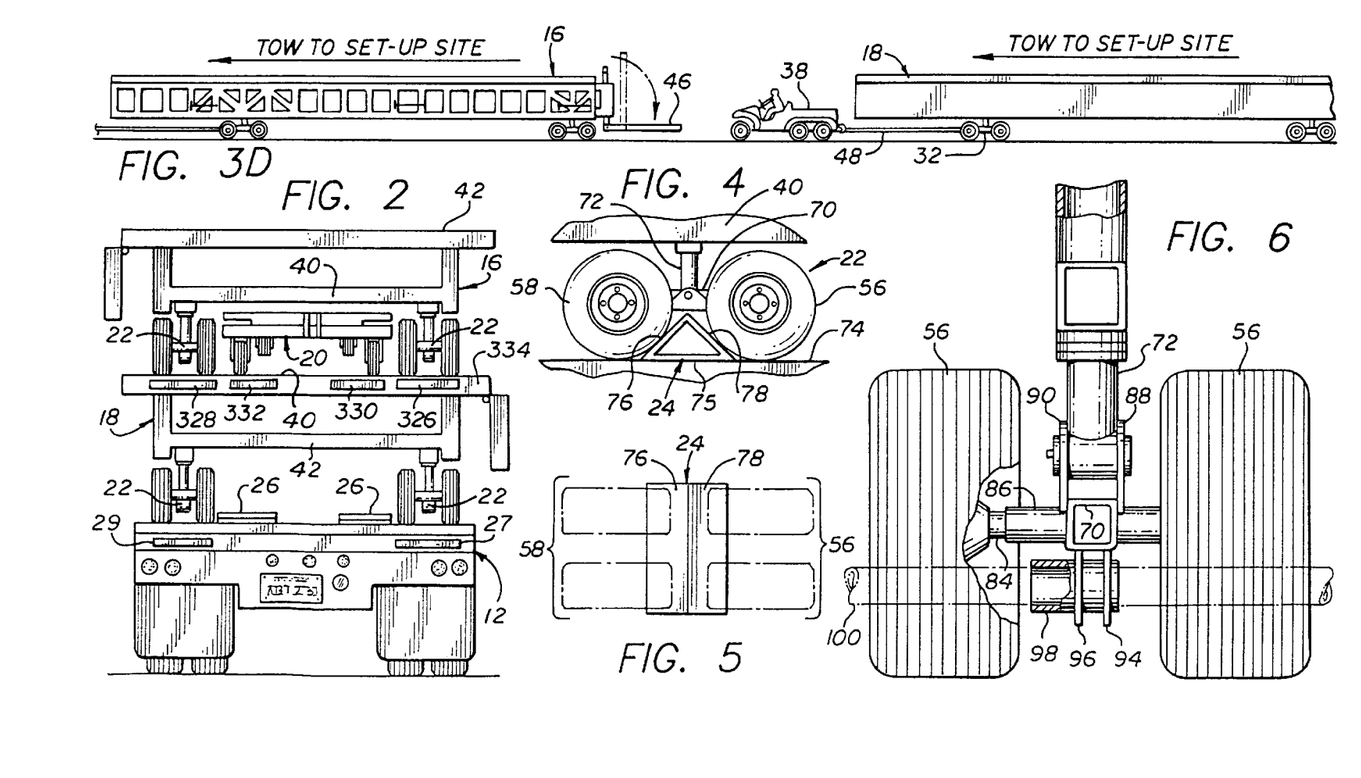
FIG. 2 is an end view taken along lines 2—2, as shown in FIG. 1.
FIGS. 3A, 3B, 3C, and 3D illustrate the steps for dismounting the elements of the portable stage from a conventional flatbed trailer.
FIG. 4 is a detail view taken within circle 4 illustrated in FIG. 1 and showing a chock useable with wheel trucks.
FIG. 5 is a top view of the wheel truck shown in phantom lines and the chock shown in FIG. 4.
FIG. 6 is an end view of a wheel truck.

FIGS. 1 and 2 illustrate a conventional truck tractor 10 used for pulling a conventional flatbed trailer 12. The elements of a portable stage, collectively identified by the numeral 14, is mounted upon trailer 12 for transport to and from locations at which the portable stage is to be assembled. The portable stage includes two units 16, 118 mounted piggyback upon trailer 12. A plurality of carts are included as part of the portable stage for the purpose of transporting equipment to be used on the stage to and from the stage. These carts are stacked in pairs 20 upon unit 18 and beneath unit 16. Each of units 16, 18 includes wheel trucks 22 to permit rolling of the respective unit off and on trailer 12 and to and from the place of assembly of the stage. A chock 24 is used between the fore-and-aft wheels of each wheel truck 22 to prevent rolling movement of the respective unit when mounted upon trailer 12. Ramps 26 may be stored upon trailer 12 during transport.

Figure 3A:
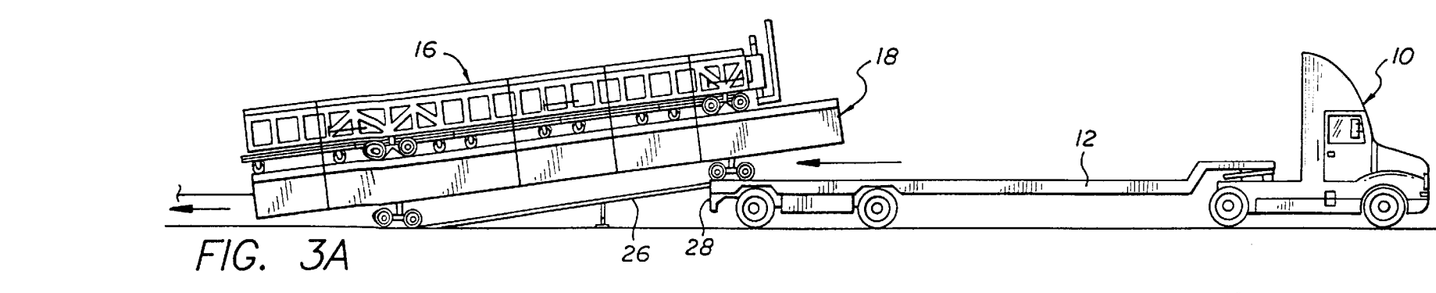
Figure 3B:
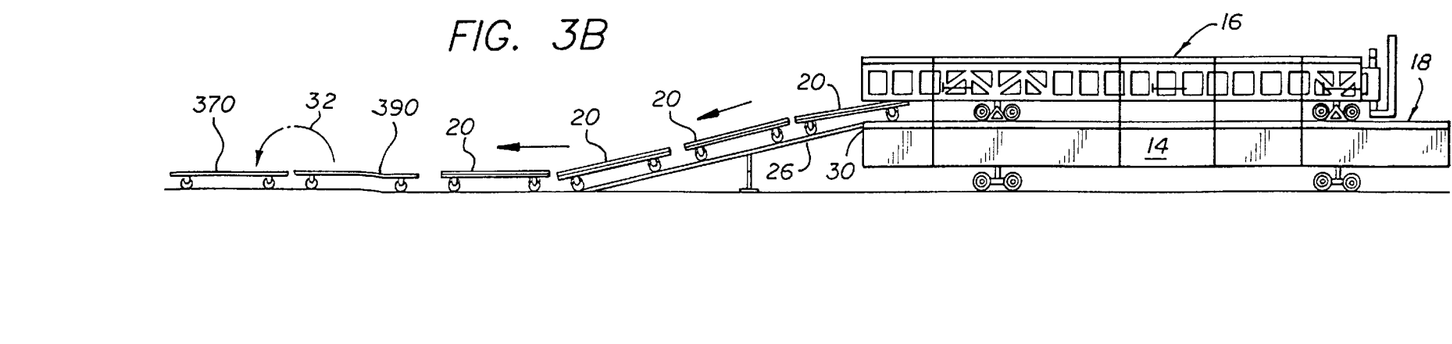
Figure 3C:
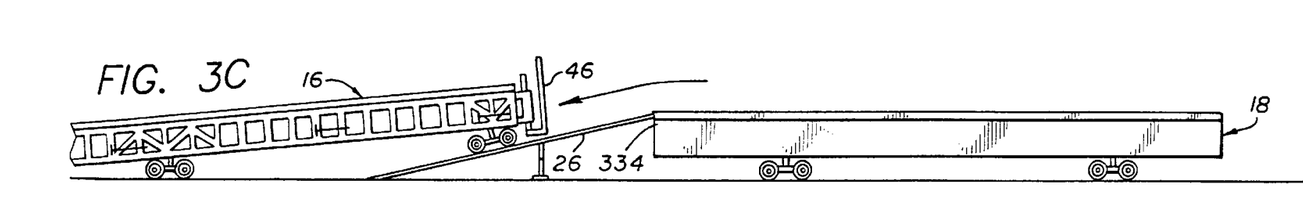

Referring jointly to FIGS. 3A, 3B, and 3C, dismounting of portable stage 14 from trailer 12 will be described; remounting of the portable stage is, in essence, a reverse of the process to be described. To begin unloading, the pair of ramps are attached to tail end 28 of trailer 12 by engagement with receivers 27 and 29, as depicted in FIG. 2. Necessarily, the pair of ramps must be long enough to accommodate a shallow enough angle to prevent drag or interference with the overhanging ends of lower unit 18. After portable stage 14 has been unloaded from trailer 12, as shown in FIG. 3B, the pair of ramps 26 are attached to end 30 of unit 18 to permit serially unloading of stacked pairs of carts 20. As represented by dashed arrow 32, each stacked pair of carts 20 is unstacked to separate the pair of carts into carts 370, 390. As depicted in FIG. 3C, unit 16 is offloaded from unit 18 through use of ramps 26. Landing 46, if attached to unit 16, is folded upwardly, as depicted, to prevent interference with the ramps.

As depicted in FIG. 3D, landing 46 is folded downwardly to its position of use. As further depicted in FIG. 3D, each of units 16 and 18 may be towed by a tow vehicle 38 attached through a yoke 48 to a pair of wheel trucks 22 located proximate an end of the unit being towed. As described in further detail below, any turns made by tow vehicle 38 are translated by yoke 48 to the wheel trucks to steer the respective unit to its location.

Figure 3E:
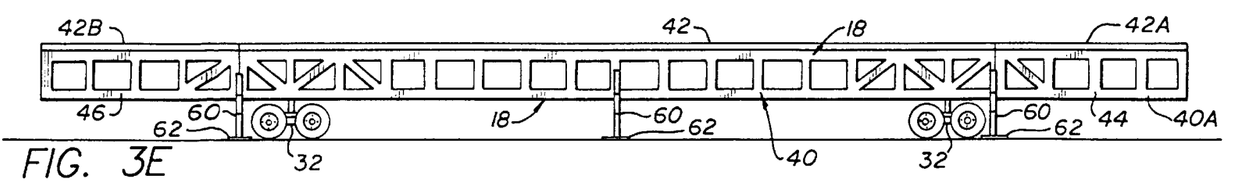
FIGS. 3E and 3F illustrate side views of two units ready for assembly to form a stage.

As depicted in FIG. 3E, unit 18 includes an open frame 40, which is preferably of aluminum to achieve the requisite rigidity with minimum weight. The frame supports a platform 42, which platform forms part of the surface of the stage to be assembled; it may include a framework for supporting sheets of plywood defining the surface of the stage to be assembled. Unit 18 includes first and second platform extensions 44, 46 bolted to frame 40 to provide the greatest length possible for unit 18 commensurate with the length of trailer 12 upon which it is transported. If a smaller size stage is required, either or both of the platform extensions may be detached from unit 18. The construction of platform extension 44 includes a frame 40A and a platform 42A, which frame and platform are commensurate with and essentially extensions of frame 40 and platform 42. similarly, platform extension 46 includes a frame 40B and a platform 42B. As shown in dashed lines in FIG. 3G, a pair of wheel trucks 22 are pivotally attached proximate the corners of unit 18 to permit rolling and steering of unit 18 from trailer 12 to the location of the stage to be erected and return to the trailer. As particularly depicted in FIG. 3G, platform 42 may include a foldable platform side 50 pivotally attached to platform 42 to increase the width of a platform. Similar foldable platform sides 52 and 54 may be attached to platforms 42A, 42B, respectively, of platform extensions 44, 46, respectively. To reduce the pressure exerted upon the surface supporting unit 18 as a function of the weight of the unit, the equipment mounted thereon, and the persons who may perform thereupon, a plurality of pivotally attached jacks 60 may be used. These jacks have a relatively large foot 62 to reduce the pressure acting upon the supporting surface.

Figures 3F, 3G:
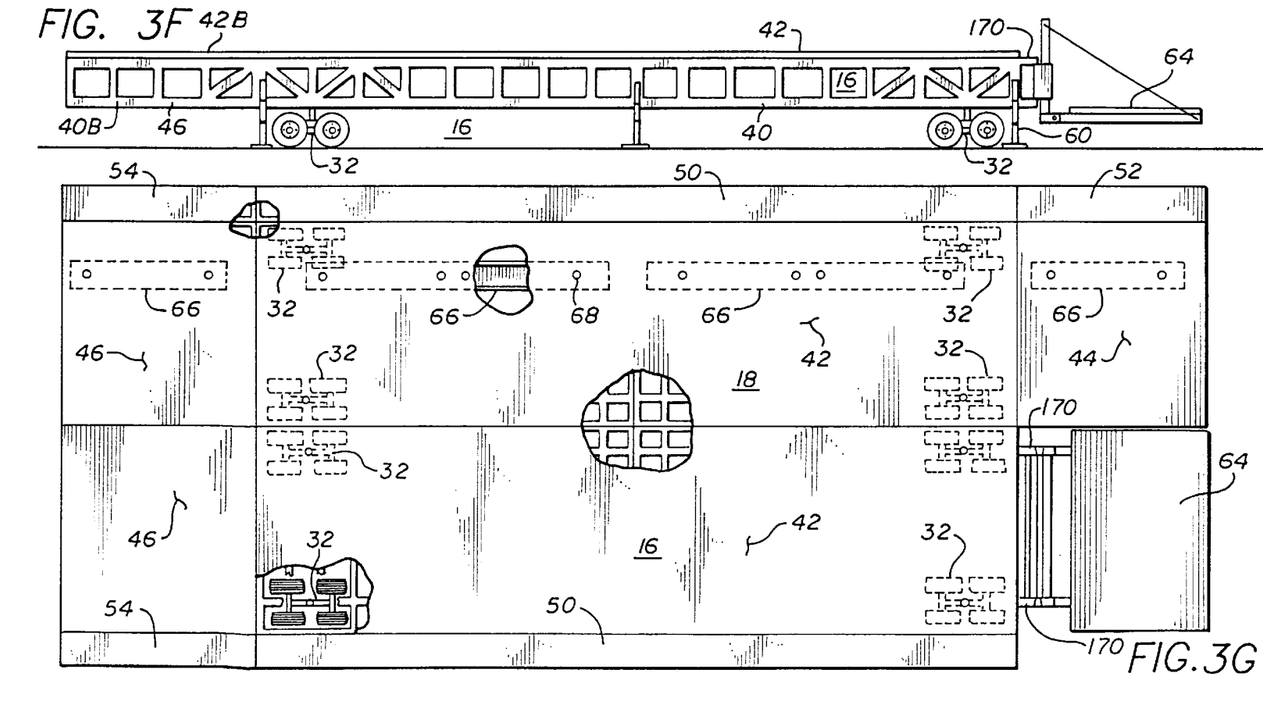
FIG. 3G is a plan view of the assembled units forming a stage.

Unit 16 shown in FIG. 3F is quite similar in construction to unit 18. This unit also includes a frame 40, a platform 42, a platform extension 46 formed of frame 40B and platform 42B. Unit 16 is supported by pivotally attached wheel trucks 22 located proximate the corners of unit 16, as depicted in FIG. 3G. To help dissipate the loads imposed upon the supporting surface by unit 16, each of a plurality of jacks 60 having a large surface area foot 62 may be incorporated. A landing 64 may be disposed at one end of unit 16 for the support of equipment and an operator(s) which are preferably not to be displayed or part of the performance to be viewed. This landing is foldable, as depicted in FIG. 3A, to permit on and off loading of unit 16. Furthermore, landing 64 may be vertically adjustable. Like unit 18, unit 16 may include foldable platform sides 50 and 54 to increase the useable width of platform 42.

As depicted in the cutaway views shown in FIG. 3G, and the sideviews shown in FIGS. 3E and 3F, frames 40, 40A and 40B may be of conventional eggcrate construction having diagonals located at high stress locations to distribute any stresses imposed throughout the frame. Each of wheel trucks 22 is attached through a shaft to a journal within frame 40 to permit rotation of each wheel truck about a vertical axis for steering purposes. A raceway 66 may be formed as part of frames 40, 40A and 40B of unit 18 to support electrical conduits that may be required for the equipment located upon the assembled stage. A plurality of access holes 68 are disposed in platforms 42, 42A, and 42B to interconnect the equipment upon the stage with a power source via the conduits. Furthermore, the raceways and access holes may also be used for channeling electrical conductors extending between pieces of equipment located upon the stage. While raceways 66 are shown in conjunction with unit 18, they may be located in unit 16 or both units may include the raceways.

Referring jointly to FIGS. 4 and 5, chocks 24 will be described in further detail. Wheel truck 22 includes two pairs of axially aligned wheels 56, 58 supported by a cross member 70. The cross member is pivotally mounted at the end of a shaft 72 extending downwardly from frame 40. The shaft may be journalled within the frame to accommodate rotation of the wheel truck about a vertical axis and permit steering of the unit during transport. Chock 24 is triangular in cross-section with a base 75 sized to rest upon a wheel supporting surface 74 and with sides 76, 78 in tangential contact with opposed wheels. Any tendency of the unit supported by wheel truck 22 to move forward or rearward is restrained by one of the wheels of the wheel truck engaging the respective one of sides 76, 78. By using a chock triangular in cross-section between opposed wheels of the wheel truck, only a single chock is required to prevent unwanted forward and rearward movement. Sliding movement of the chock in response to a force exerted by one of the opposed wheels is restrained by the downward force acting upon the respective side (76 or 78) of the chock by the wheel tending to roll up upon the side and thereby increase the downward force, and friction, of the chock upon the supporting surface. Nevertheless, to reduce any possibility of sliding movement of the chock upon platform 42 of unit 18 (see FIG. 1) during transport, the chock may be locked in place by a key and keyway, or functional equivalent, between the chock and the platform of unit 18.

Figures 7, 9A, 9B:
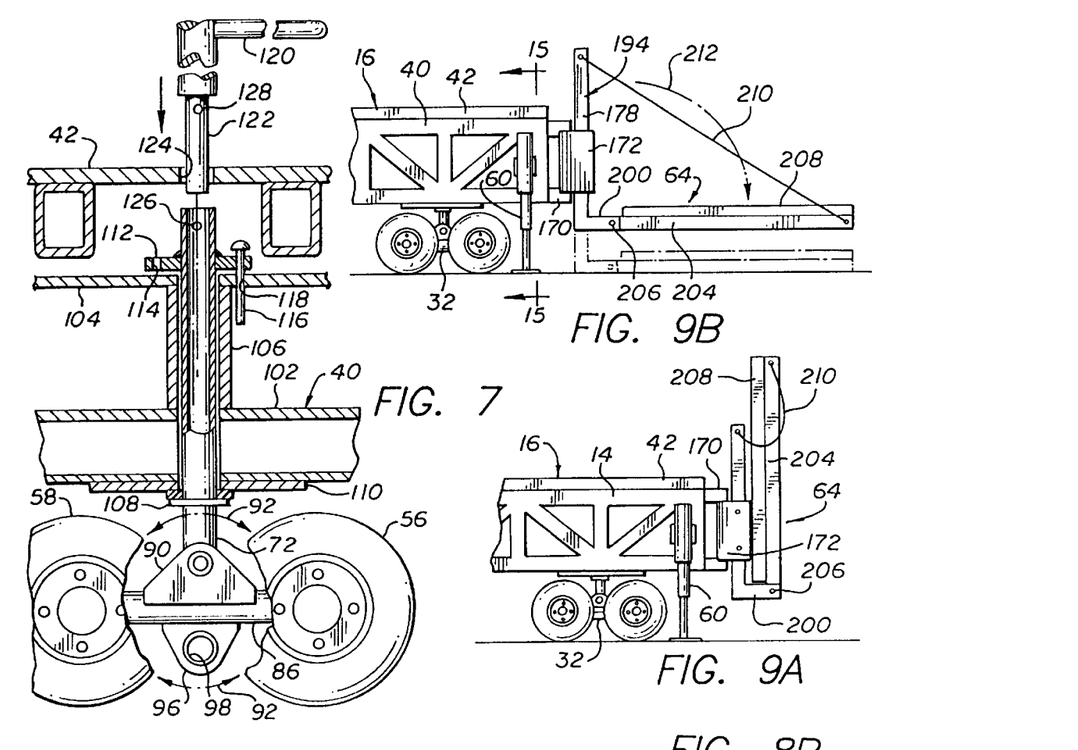
FIG. 7 is a side view of a wheel truck and illustrating mounting mechanism for securing it to a unit.
FIGS. 9A and 9B are side views illustrating the positioning during use and transport of a landing attached to one unit.

Referring jointly to FIGS. 6 and 7, further details attendant the wheel trucks and the apparatus for securing same to the respective frame will be described. Each wheel truck includes two pairs of wheels 56, 58 mounted upon respective common shafts. As shown in FIG. 6, wheels 56 are mounted upon shaft 84. Shaft 84 is rotatably supported in journal 86 extending laterally from cross member 70. The cross member includes a pair of tangs 88, 90 extending upwardly therefrom. These tangs are pivotally secured to the lower end of vertical shaft 72 to accommodate rocking movement of the wheel trucks, as depicted by arrows 92 in FIG. 7. A further pair of tangs 94, 96 extend downwardly from cross member 70 and support a tube 98. Tube 98 is hollow to permit removable insertion of a shaft 100, which shaft is used in conjunction with yoke 48 (see FIGS. 3D and 8A) to urge pivotal movement of the wheel truck about the axis of shaft 72.

Shaft 72 extends through a longeron 102 (or a cross member) of frame 40 and a further longeron 104 (or cross member) of the frame. A journal 106 secured to frame 40 rotatably supports shaft 72. Upward vertical movement of shaft 72 is restrained by a washer 108 welded or otherwise secured to the shaft and bearing against a low friction plate (which may be made of a sheet of low friction material such as that sold under the Teflon trademark) disposed between the washer and a load distributing plate 110 attached to frame 40. A disk 112 is secured to the upper end of shaft 72 by a weld, or the like. The disk includes a plurality of apertures 140 to accommodate penetrable insertion of a pin 116 extending through one of apertures 114 and an aperture 118 disposed in frame 40. Thereby, pin 116 may be used to prevent pivotal movement of the wheel truck about its vertical axis of rotation. To permit manual rotation of a wheel truck, and steering of the unit, a tiller 120 may be employed. The tiller includes a rod 122 for penetrable insertion within shaft 72. Necessarily, an aperture 124 in platform 42 of the unit must be located in axially alignment with the shaft to permit passthrough of the rod. To prevent independent rotation of the tiller with respect to the attached shaft, a locking pin may be used to penetrably interconnect opposed apertures 126 at the upper end of shaft 72 with passageway 128 in rod 122. For manual steering of a unit, tiller 120 is brought into locking engagement with the respective shaft of the wheel truck to be turned. When further steering of the wheel truck is no longer needed, the tiller may be disengaged and removed to prevent it from becoming an obstruction on the platform.

Figure 8A:
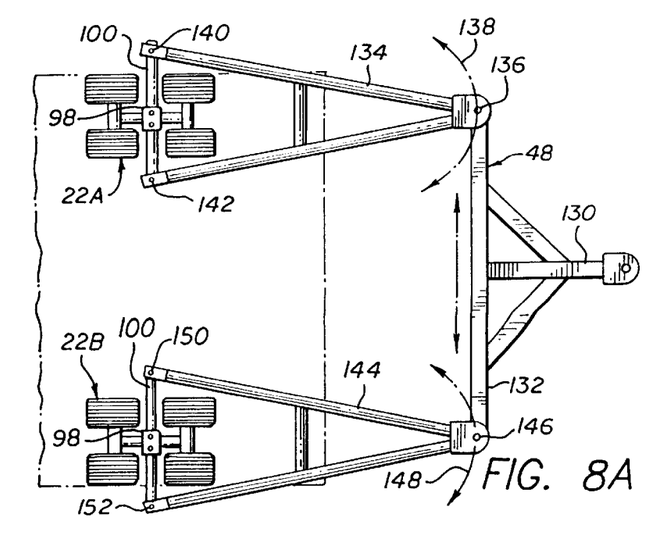
FIG. 8A illustrates a yoke for engaging a pair of wheel trucks to steer the unit while being pulled by a vehicle.

Yoke 48 (see FIG. 3D) will be described with primary reference to FIGS. 8A and 8B. To accommodate steering of a unit, the wheel trucks at either the forward or rear end of the unit must be pivoted. Furthermore, the pivotal movement of the trucks must be in concert with one another to prevent dragging of the wheels of one wheel truck and damage to the supporting surface. Moreover, transport is greatly impeded unless both wheel trucks track true. Yoke 48, attached to a towing vehicle (and interconnecting wheel trucks 22A and 22B) translates a pulling or pushing force by the tow vehicles to both wheel trucks. Furthermore, any turning of the tow vehicle causes repositioning of the yoke to bring about a commensurate pivotal, and turning, movement of the two wheel trucks. In particular, a turning movement of the tow vehicle will result in lateral displacement of draw bar 130. This displacement will produce a sideways movement of bar 132. The apex of a first rigid triangular member 134 is pivotally attached to bar 132 by pivot mechanism 136. The pivot mechanism permits pivotal movement of member 134 with respect to bar 132 as depicted by arrow 138. The arms of triangular member 134 are pivotally attached to shaft 100 extending through tube 98 (see FIG. 6) by pins 140, 142. Upward and downward pivotal movement of member 134 with respect to shaft 100 is accommodated by rotation of shaft 100 within tube 98. The apex of a similar second rigid triangular member 144 is secured to bar 132 by pivot mechanism 146 to accommodate pivotal movement as depicted by arrow 148. The arms of triangular member 144 are secured to wheel truck 22B by pins 150, 152 engaging shaft 100 extending through tube 98.

In operation, any turning movement of the towing vehicle will result in lateral displacement of bar 132. Such lateral displacement will result in pivotal movement of each of triangular members 134, 144 about the axis of rotation of the respective shaft 72 supporting each wheel truck 22A and 22B. Thus, the wheel trucks will track any turns made by the tow vehicle. It is to be understood that the tow vehicle could push the unit while also bringing about a steering function to the unit as a result of operation of yoke 48.

Figure 8B:
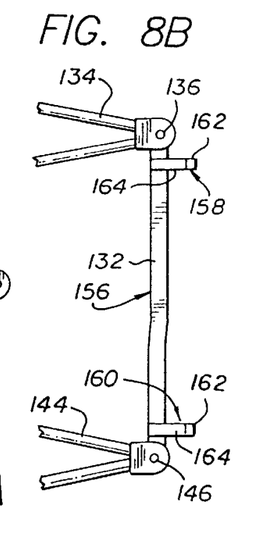
FIG. 8B is a partial view of a yoke shown in FIG. 8A and illustrating a modification for manually steering the unit by manipulation of the yoke.

Referring to FIG. 8B, there is illustrated a modification of yoke 48 to permit simultaneous manual steering of two pairs of wheel trucks. This yoke is used primarily with respect to the two rear pairs of wheel trucks while the unit is being pulled by a tow vehicle via yoke 48, as shown in FIG. 3D. Thereby, sideways (lateral) movement of the unit is possible to facilitate positioning of the unit at the location where the stage is to be assembled or to align the unit with the trailer prior to loading of same. Modified yoke 48 depicted in FIG. 8B is identified by reference numeral 156. It includes a bar 132 pivotally attached to triangular members 134 and 144 via pivot mechanisms 136 and 146. Manipulation of yoke 156, and particularly lateral translation of bar 132, is manually effected through uprights 158, 160 extending upwardly from bar 132. Each of these uprights includes a stanchion 162 extending upwardly and which stanchion may be offset from bar 132 by an offset member 164.

Referring jointly to FIGS. 9A, 9B, 9C, and 9D, landing 46 and its operation will be described in detail. Frame 40 of unit 16 includes members 170 for supporting sleeves 172, 174. As particularly illustrated in FIG. 9D, each of the sleeves includes a lining 176 of low friction material (such as that sold under the Teflon trademark) to minimize sliding of friction of uprights 178, 180. A roller 182 may extend from each of the sleeves, such as sleeve 174, to prevent tilting and binding of the uprights with the sleeves. Pins, such as pin 184 may be employed to penetrably engage passageways 186, 188 extending through sleeve 174 and selected commensurate holes 190, 192 in upright 180. Similar passageways and pins may be used in combination with sleeve 172 and upright 178. These pins lock the landing at a selected elevation.

Figure 9C:
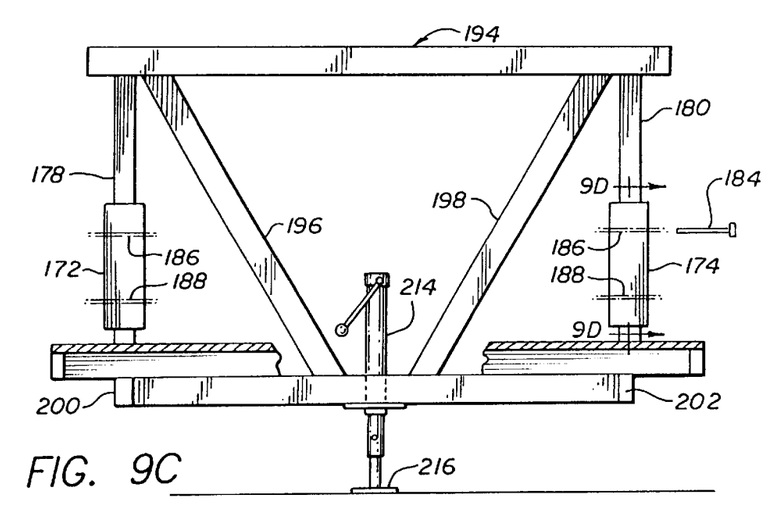
FIG. 9C illustrates elevating apparatus for the landing shown in FIGS. 9A and 9B.
Figure 9D:
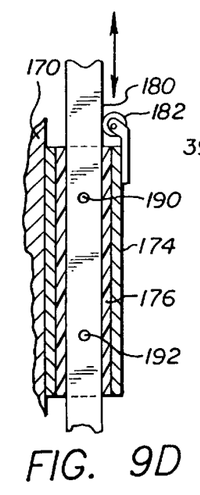
FIG. 9D is a detail view taken along lines. 9D—9D, as shown in FIG. 9C.

Landing 46 includes an upright frame 194, of which uprights 178, 180 are a part. Diagonals 196, 198 provide rigidity to the upright frame. Legs 200, 202 extending laterally from the lower end of upright frame 194, pivotally support a horizontal frame 204 at pivots, of which pivot 206 is illustrated. The horizontal frame supports a surface member 208 upon which equipment and operators may be located. Support of surface member 208 in the horizontal position depicted in FIG. 9B is provided in part by a pair of cables, of which cable 210 is illustrated, extending from the upper end of upright member 194 to the extremity of horizontal frame 204. Such cables permit upward pivotal movement of landing 46, as depicted by arrow 212 and shown in FIG. 9A. Vertical positioning of landing 46 may be accommodated by a jack 214, as depicted in FIG. 9C. By operating the jack to extend and retract foot 216, landing 46 may be raised and lowered, as depicted in phantom lines in FIG. 9B, and locked in place by pins 184.

Figure 10:
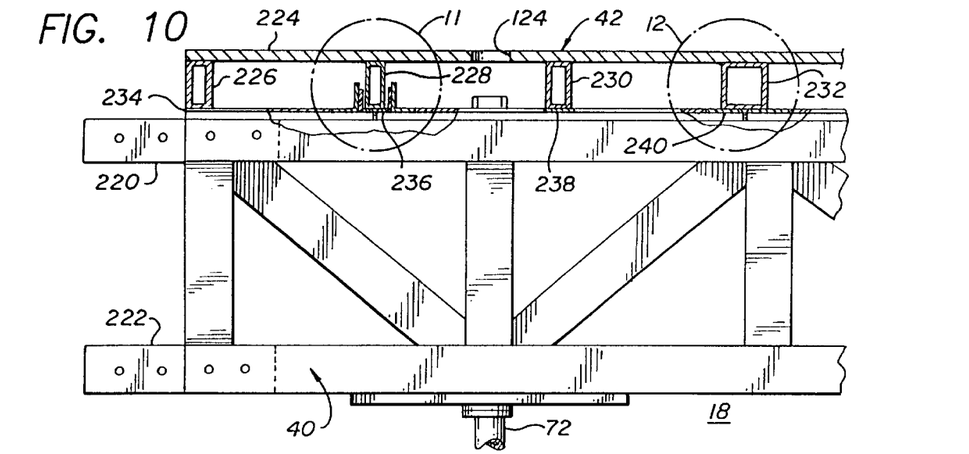
FIG. 10 illustrates structure for accommodating limited movement of a platform relative to its underlying frame.
Figure 11:
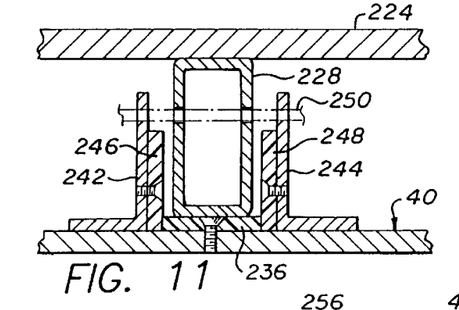
FIG. 11 is a detail view taken within circle 11, as shown in FIG. 10.
Figure 12:
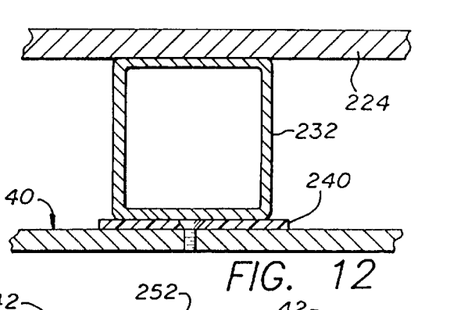
FIG. 12 is a detail view taken within circle 12, as shown in FIG. 10.

As discussed above, units 16 and 18 are positioned essentially adjacent one another, as depicted in FIG. 3G, manually and/or by use of a tow vehicle. Such positioning generally is not precise enough to ensure that platforms 42 of each of the units are in contacting relationship and without a gap therebetween. Were a gap to exist, a hazard to performers upon the stage would exist. To ensure that no gap exists, platform 42 of unit 18 is movable with respect to its frame 40 to position its longitudinal edge immediately adjacent the longitudinal edge of platform 42 of unit 16. Such positioning and a slide assembly therefor will be described with particular reference to FIGS. 10, 11, 12, and 13. The section of unit 18 shown in FIG. 10 depicts shaft 72 supporting a wheel truck 22 along with structure securing the shaft to frame 40. Moreover, aperture 124 in platform 42 for receiving rod 122 of tiller 120 is illustrated. Additionally, doublers 220 and 222 extending from frame 40 for engagement with frame extension 40B (see FIG. 3E) are shown. These doublers provide the requisite structural strength and rigidity to support the frame extension. Repositioning of platform 42 with respect to frame 40 is accomplished by positioning the substructure supporting platform surface 224 upon low friction elements to accommodate sliding movement therebetween. In particular, illustrated cross members of the substructure identified with numerals 226, 228, 230, and 232 rest upon low friction liners 234, 236, 238, and 240, respectively, attached to frame 40. To prevent unlimited fore-and-aft and sideways movement of platform 42 with respect to frame 40, certain of the cross members of the platform substructure are located within guides or channels. For example, cross member 228, as depicted in FIG. 11, is limited in fore-and-aft movement by flanges 242, 244 extending upwardly from frame 40. These flanges may be lined with liners 246, 248 of low friction material. During transport of unit 18, it is mandatory that platform 42 be rigidly or lockingly attached to frame 40. To obtain such attachment, bolts or pins 250 may be employed to lock the platform to the frame by penetrably engaging flanges 242, 244 and cross member 228. The pin will prevent lateral movement of the cross member and the flanges will prevent fore-and-aft movement of the cross member.

Figure 13:
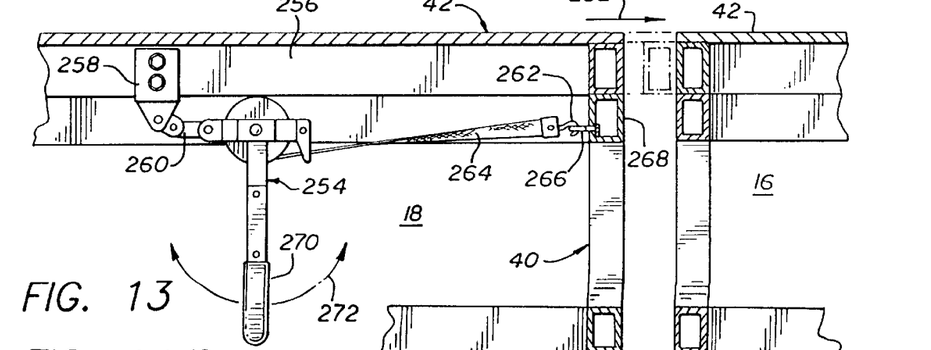
FIG. 13 illustrates apparatus for repositioning a platform of a unit relative to its frame and to the platform of an adjacent unit.
Figure 14:
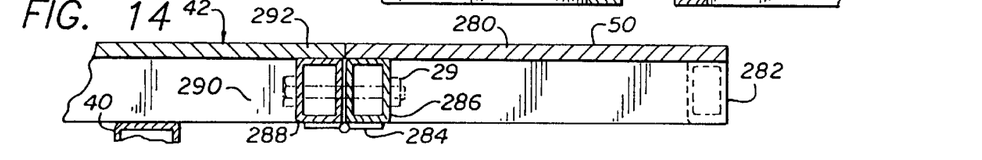
FIG. 14 illustrates a foldable platform side to accommodate width restrictions imposed during transport of the unit upon the highways.

To draw platform 42 of unit 18 adjacent platform 42 of unit 16, as represented by arrow 252 in FIG. 13, each of a plurality of come-alongs 254 positioned at intervals along the length of unit 18 may be employed. The come-along is attached to a cross member 256 of the substructure of platform 42 by an anchor 258 and linkages 260. Hook 262 at the end of cable 264 extending from come-along 254 is engaged with a loop 266 secured to a longeron 268 of frame 40. By pivotal movement of handle 270 of come-along 254, as depicted by arrow 272, cable 264 will become retracted, as is conventional with a come-along. Upon such retraction, platform 42 will be drawn toward loop 266 serving as an anchor and result in lateral sliding movement of the platform as represented by arrow 262, to a position adjacent platform 42 of unit 16, as depicted in dashed lines. Thereby, final precise adjustments of the position of platform 42 of unit 18 can be made manually relatively rapidly to ensure the lack of any significant gap between platforms 42 of units 16 and 18. Thereby, the resulting stage formed by both platforms will be an essentially continuous surface. This process, including reversal of orientation of come-along 254, is reversed during disassembly of the stage in order to relocate the platform upon its frame to its initial orientation prior to subsequent transport of the unit.

Figures 16, 18:
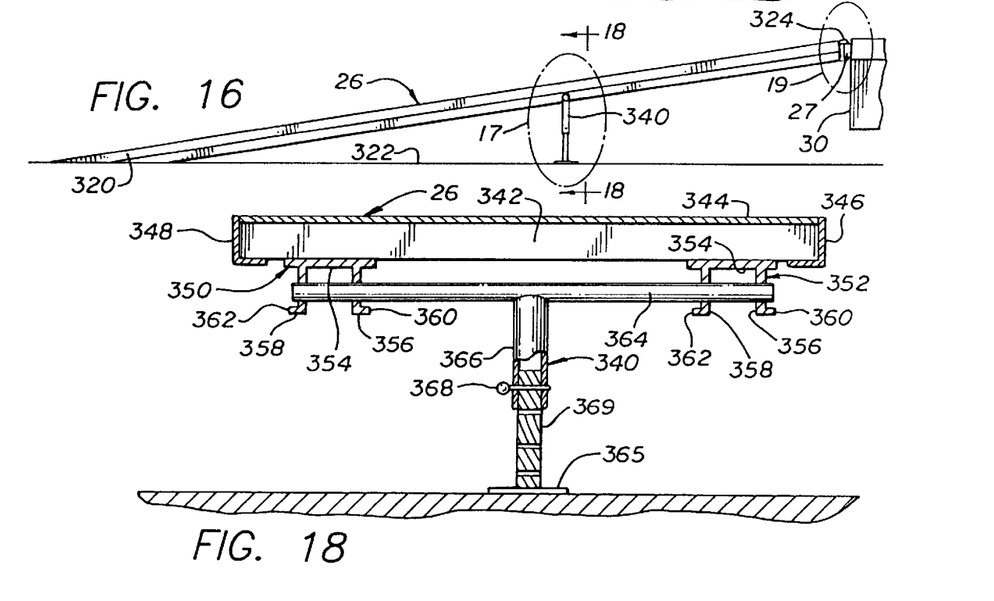
FIG. 16 illustrates a ramp for transferring the units of a stage onto and off of a conventional flatbed trailer.
FIG. 18 is a detail view taken along lines 18—18, as shown in FIG. 16.
Figure 17:
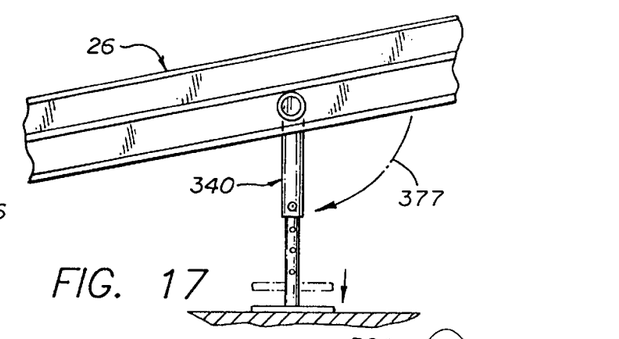
FIG. 17 is a detail view taken within circle 17, as shown in FIG. 16.
Figure 19:
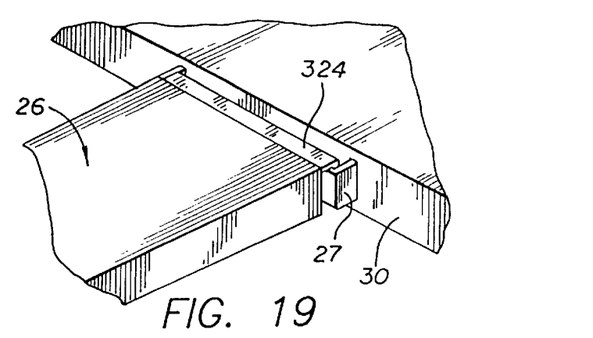
FIG. 19 is a detail view taken within circle 19, as shown in FIG. 16.
Figure 20:
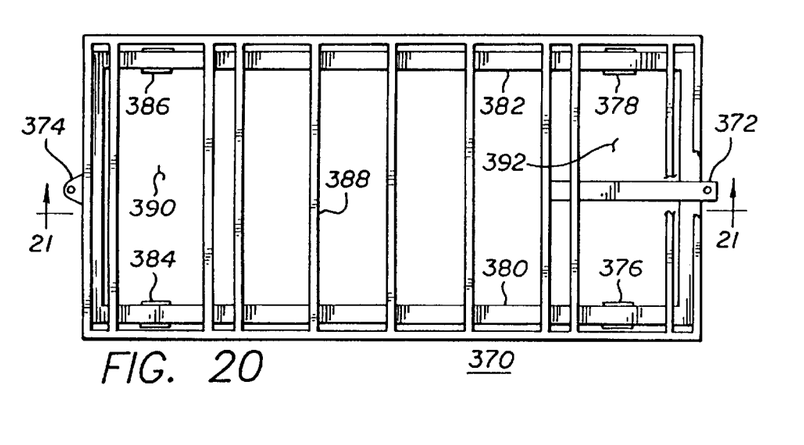
FIG. 20 is a top view of one of a pair of nestable carts.
Figure 21:
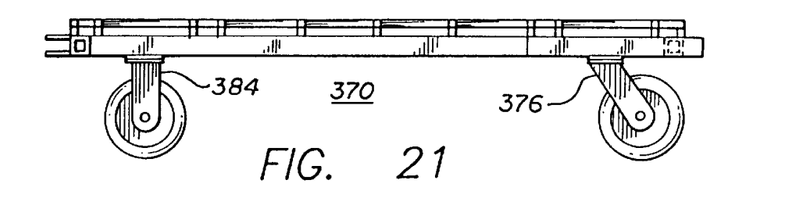
FIG. 21 is a side view of taken along lines 21—21, as shown in FIG. 20.

As discussed above, each of units 16 and 18 may have platforms with foldable lateral sides (as represented by numerals 50, 52, and 54 shown in FIG. 3G). FIG. 18 illustrates a typical foldable extension identified by numeral 50. The extension includes a platform surface 280 supported upon a substructure 282 of sufficient rigidity to accommodate the loads imposed without bending or deformation. A hinge 284 pivotally interconnects longeron 286 of substructure 282 with longeron 288 of subframe 290 supporting platform surface 292. To secure platform side 50 in the unfolded position depicted, a nut and bolt assembly 294 penetrably interconnects longerons 286 and 288 to preclude pivotal movement of platform side 50 about the hinge line of hinge 284. It may be noted that the hinge may be a plurality of hinges aligned along their pivot axis or a continuous hinge.

Figure 15:
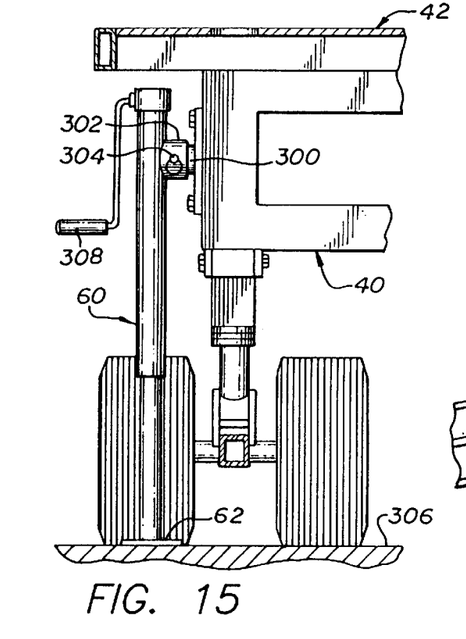
FIG. 15 is a detail view taken along lines 15—15, as shown in FIG. 9B.

Referring to FIG. 15, there is illustrated a wheel truck extending from a frame 40 supporting a platform 42. A jack 60 is pivotally secured to frame 40 through a stub 300 extending from frame 40. A collar 302, secured to the body of jack 60 encircles the stub and serves the function of permitting rotation of the jack about the axis of the stub. A removable pin 304 may be employed to engage both the stub and the collar to lock the jack in the downward position illustrated in FIG. 15 or in the horizontal position depicted in FIG. 1. The jack includes a foot 62 of relatively large size to minimize the pressure of the force exerted upon the supporting surface 306, which may be a playing field or the like, and thereby minimize the damage to the playing surface that might otherwise occur. Extension and retraction of foot 62 is conventional and effected through rotation of handle 308.

Referring jointly to FIGS. 16, 17, 18, and 19, details of earlier discussed ramps 26 will be described. One end of ramp 26 is tapered for contact with a ground surface 322 to reduce the size of the step traversed by the wheels on loading and unloading. The other end of the ramp includes a hook mechanism 324, which may be in the nature of a right angle member extending for the width of the ramp. A leg of the hook mechanism engages receiver 27 disposed, for instance, at end 30 of trailer 12, as depicted in FIG. 2. It is to be noted that corresponding receivers 326, 328 are disposed at end 334 of unit 18, as depicted in FIGS. 2 and 3C. Receivers 326, 328 are used with ramps 26 to load and unload unit 16 onto and off of unit 18. Receivers 330, 332 at end 334 of unit 18 are used with the ramps to load and unload pairs of carts 20 onto and off of unit 18.

To accommodate use of ramps 26 made of aluminum and therefore of relatively light weight without compromising safety, a mid-span support 340 is employed. Ramp 26 includes a substrate 342, which may be three-quarter inch thick plywood covered by an aluminum sheet 344 having folded over lateral edges 346, 348. Extrusions 350, 352 extend in spaced apart relationship longitudinally along the underside of the ramp. Each of these extrusions includes a base 354, spaced apart extensions 356, 358 having lips 360, 362. In this manner, the extensions serve in the manner of I-beams to resist bending in all three axes. Support 340 includes a transverse rod 364 penetrably engaging the extensions of each of extrusions 350 and 352 and pivotally supported therein. Thereby, support 340 acts directly upon the extrusions to resist bending of the ramp during use of the ramp. The support includes a foot 365 extendable from a sleeve 366. The foot is positionally fixable by a pin 368 interconnecting sleeve 370 with stanchion 369. During non-use of a ramp, support 340 is pivotable toward the ramp as depicted by arrow 377 in FIG. 17 into a location between extrusions 350, 352.

Each cart 370, 390 of the pairs of carts 20 shown in FIGS. 1, 2, 3A, and 3B will be described with joint reference to FIGS. 21–27. Cart 370, shown in FIGS. 21, 22, and 23, includes a draw bar 372 to be used in pulling the cart and a shackle 374 for receiving the draw bar of a trailing cart. A pair of castering wheels 376, 378 are attached to corresponding side located longerons 380, 382. A pair of rigidly mounted wheels 384, 386 are also secured to the longerons. A plurality of cross members 388 are attached to and extend across longerons 380, 382 to provide a deck for objects to be transported upon cart 370. The cross members are positioned to provide wide spaces 390, 392 at opposed ends of the cart with space 392 being essentially bisected by draw bar 372.

Figures 22, 26, 27:
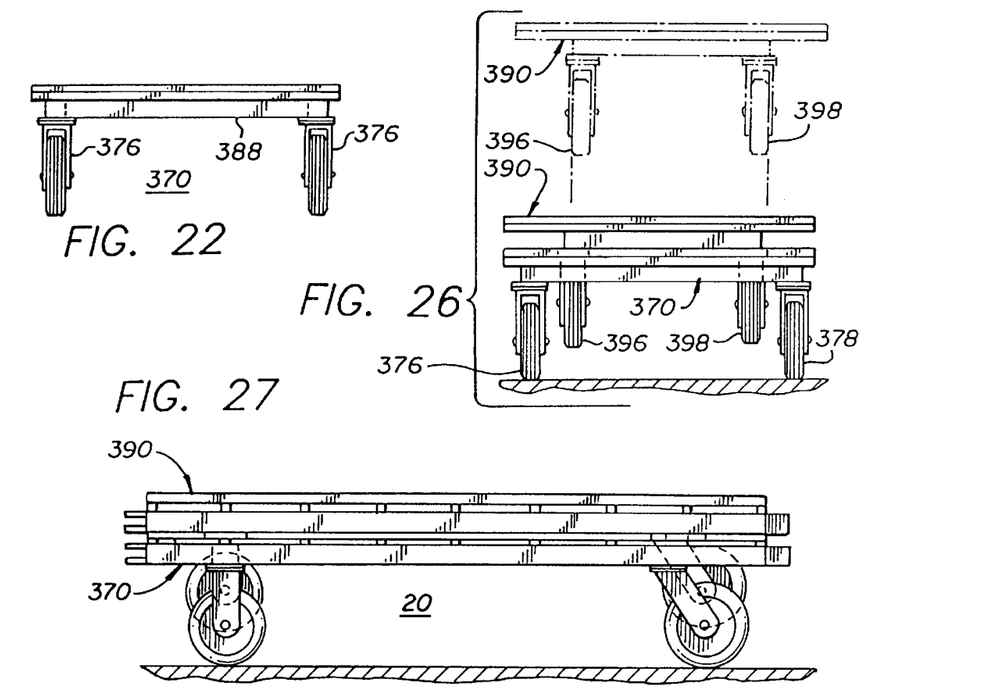
FIG. 22 is an end view of the cart shown in FIG. 20.
FIG. 26 illustrates nesting of the carts shown in FIGS. 20 and 23.
FIG. 27 is a side view illustrating nested carts.
Figure 23:
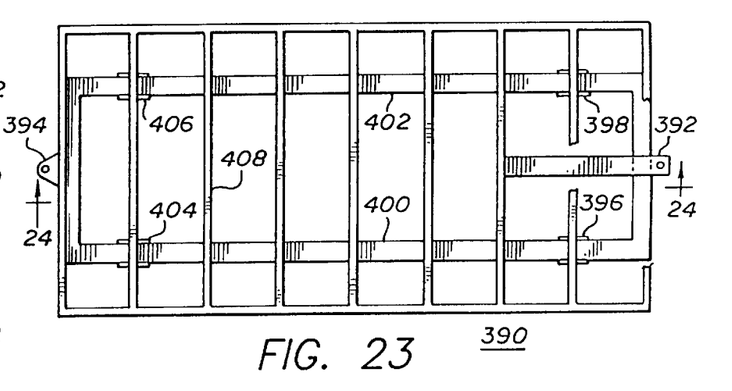
FIG. 23 illustrates the second of a pair of nestable carts.
Figure 24:
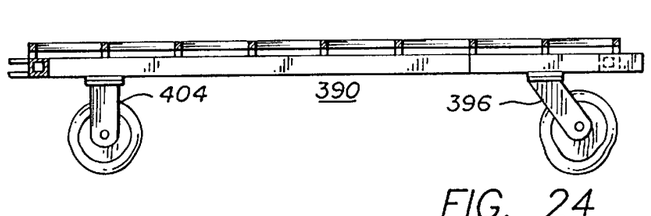
FIG. 24 is a detail view taken along lines 24—24, as shown in FIG. 23.
Figure 25:
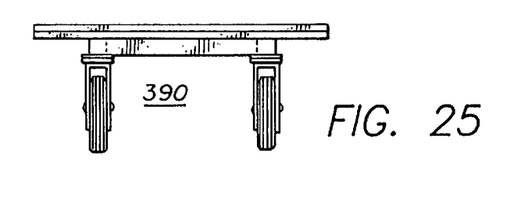
FIG. 25 is an end view of the cart shown in FIG. 23.

Cart 390, illustrated primarily in FIGS. 24, 25, and 26, includes a draw bar 392 at the front end and a shackle 394 at the rear end. A pair of castering wheels 396, 398 extend downwardly from longerons 400, 402. A pair of rigidly mounted wheels 404 and 406 extend downwardly from these longerons. A plurality of cross members 408 extend across the longerons and define a deck for supporting the elements to be transported by cart 390. By comparison of the longerons shown in FIG. 24 of cart 390 with the longerons shown in FIG. 21 with regard to cart 370, it will be evident that longerons 400 and 402 are significantly closer together than longerons 380 and 382 of cart 370. This displacement of the respective longerons will permit insertion of castering wheels 396, 398 of cart 390 through space 392 defined by the cross members of cart 370. Similarly, space 390 of cart 370 will accommodate penetrable insertion of fixed wheels 404, 406 of cart 390. Thereby, and as particularly shown in FIGS. 27 and 28, cart 390 can be stacked upon cart 370 to minimize the height for storage of the pair of carts. The stored configuration of pair of carts 20 is illustrated as a side view in FIG. 28.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention.

What is claimed is:

1. A transportable stage comprising in combination:
   (a) a first unit having a first frame and a first platform supported upon said first frame;
   (b) a second unit having a second frame and a second platform supported upon said second frame;
   (c) a plurality of wheel trucks for supporting and transporting each of said first and second units to and from the location of assembly of said stage;
   (d) a journal member interconnecting each wheel truck of said plurality of wheel trucks with one of said first and second frames to permit steering each of said first and second units during individual movements of said first and second units to and from the location of assembly and disassembly of said stage; and
   (e) one of said first and second units including a slide assembly for slidably mounting and angularly reorienting the respective first and second platform upon and with respect to the respective first and second frame to permit sliding positioning and angular reorientation of the slidable platform to a location adjacent the other platform upon assembly of said stage.

2. The transportable stage as set forth in claim 1 wherein said slide assembly includes guides for limiting movement of said platform relative to said frame.

3. The transportable stage as set forth in claim 1 including low friction liners for reducing frictional resistance to movement of said platform relative to said frame.

4. The transportable stage as set forth in claim 1 wherein said slide assembly includes apparatus for urging movement of the respective first and second platform relative to the respective first and second frame.

5. The transportable stage as set forth in claim 1 wherein said slide assembly includes locking apparatus for selectively locking the respective first and second platform with the respective first and second frame to prevent relative movement therebetween.

6. The transportable stage as set forth in claim 1 wherein said platform of at least one of said units includes a foldable platform side for increasing the width of said platform upon unfolding said platform side.

7. The transportable stage as set forth in claim 1 wherein the platform of at least one of said first and second units includes a platform extension attached to the end of the platform for increasing the length of the platform.

8. The transportable stage as set forth in claim 1 including a chock for inhibiting movement of a wheel truck, said chock being triangular in cross-section and comprising a base for resting upon a supporting surface and a pair of sides angled upwardly toward one another to tangentially engage opposed wheels of the wheel truck.

9. A transportable stage comprising in combination:
(a) a first unit having a first frame and a first platform supported upon said first frame;
(b) a second unit having a second frame and a second platform supported upon said second frame;
(c) a plurality of wheel trucks for supporting and transporting each of said first and second units to and from the location of assembly of said stage;
(d) a journal member interconnecting each wheel truck of said plurality of wheel trucks with one of said first and second frames to permit steering each of said first and second units during individual movements of said first and second units to and from the location of assembly and disassembly of said stage; and
(e) one of said first and second units including a slide assembly for slidably mounting the respective first and second platform upon the respective first and second frame to permit sliding positioning of the slidable platform adjacent the other platform upon assembly of said stage, said slide assembly including at least one come-along for urging movement of the respective first and second platform relative to the respective first and second frame.

10. A transportable stage comprising in combination:
(a) a first unit having a first frame and a first platform supported upon said first frame;
(b) a second unit having a second frame and a second platform supported upon said second frame;
(c) a plurality of wheel trucks for supporting and transporting each of said first and second units to and from the location of assembly of said stage;
(d) a yoke for engaging first and second ones of said wheel trucks disposed at one end of one of said units to pull and steer said unit to and from the location of assembly of said stage, said yoke including a first rigid triangular member having an apex and a pair of arms secured to opposed sides of said first wheel truck, a second rigid triangular member having an apex and a pair of arms secured to opposed sides of said second wheel truck and a bar pivotally attached to the apex of each of said first and second rigid triangular members;
(e) a journal member interconnecting each wheel truck of said plurality of wheel trucks with one of said first and second frames to permit steering each of said first and second units during individual movements of said first and second units to and from the location of assembly and disassembly of said stage; and
(f) one of said first and second units including a slide assembly for slidably mounting the respective first and second platform upon the respective first and second frame to permit sliding positioning of the slidable platform adjacent the other platform upon assembly of said stage.

11. The transportable stage as set forth in claim 10 wherein said yoke includes a draw bar extending from said bar for attachment to a tow vehicle.

12. The transportable stage as set forth in claim 10 wherein said yoke includes at least one upright extending from said bar for manually manipulating said yoke.

13. A transportable stage comprising in combination:
(a) a first unit having a first frame and a first platform supported upon said first frame;
(b) a second unit having a second frame and a second platform supported upon said second frame;
(c) a landing disposed at the end of the frame of at least one of said first and second units, said landing including a jack for raising and lowering said landing and a pivot mechanism for folding said landing toward the respective frame;
(d) a plurality of wheel trucks for supporting and transporting each of said first and second units to and from the location of assembly of said stage;
(e) a journal member interconnecting each wheel truck of said plurality of wheel trucks with one of said first and second frames to permit steering each of said first and second units during individual movements of said first and second units to and from the location of assembly and disassembly of said stage; and
(f) one of said first and second units including a slide assembly for slidably mounting the respective first and second platform upon the respective first and second frame to permit sliding positioning of the slidable platform adjacent the other platform upon assembly of said stage.

14. The transportable stage as set forth in claim 13 wherein said landing includes a pair of uprights and a pair of sleeves attached to the frame for guiding vertical displacement of said pair of uprights during raising and lowering of said landing, and a roller mechanism extending from each sleeve of said pair of sleeves into contact with the respective one of said pair of uprights to prevent binding of said pair of uprights within said pair of sleeves.

15. A transportable stage comprising in combination:
(a) a first unit having a first frame and a first platform supported upon said first frame;
(b) a second unit having a second frame and a second platform supported upon said second frame;
(c) a plurality of wheel trucks for supporting and transporting each of said first and second units to and from the location of assembly of said stage, each of said wheel trucks including a vertical shaft rotatably secured to the respective one of said first and second frames to accommodate rotation of said wheel truck about a vertical axis;
(d) a journal member interconnecting each wheel truck of said plurality of wheel trucks with one of said first and second frames to permit steering each of said first and second units during individual movements of said first and second units to and from the location of assembly and disassembly of said stage; and (e) one of said first and second units including a slide assembly for slidably mounting the respective first and second platform upon the respective first and second frame to permit sliding positioning of the slidable platform adjacent the other platform upon assembly of said stage.

16. The transportable stage as set forth in claim 15 including a tiller for engaging one of said shafts to manually rotate the respective one of said wheel trucks to steer the respective unit during movement of the unit.

17. In a pair of units assemblable side by side into a stage wherein each unit includes a frame supported on a plurality of wheel trucks and a platform for becoming a part of the stage, the improvement comprising a slide assembly for slidably mounting one of the platforms upon its respective frame to permit sliding positioning and angular reorientation in a horizontal plane of the slidable platform adjacent the other platform upon assembly of the stage, including guides for limiting movement of the slidable platform relative to the frame, low friction liners for reducing frictional resistance to movement of the slidable platform relative to the frame, and apparatus for urging movement of the slidable platform relative to the frame.

18. The improvement as set forth in claim 17 including locking apparatus for selectively locking the slidable platform with the frame to prevent movement therebetween.

19. In a pair of units assemblable side by side into a stage wherein each unit includes a frame supported on a plurality of wheel trucks and a platform for becoming a part of the stage, the improvement comprising a slide assembly for slidably mounting one of the platforms upon its respective frame to permit sliding positioning of the slidable platform adjacent the other platform upon assembly of the stage, including guides for limiting movement of the slidable platform relative to the frame, low friction liners for reducing frictional resistance to movement of the slidable platform relative to the frame, and apparatus for urging movement of the slidable platform relative to the frame and including at least one come-along.

* * * * *